July 26, 1955  W. C. JENNER ET AL  2,713,715
COIL MAKING METHOD
Filed May 27, 1952  4 Sheets-Sheet 1

INVENTORS
William C. Jenner
Robert S. Wick
BY Charles R. Newpher
Woodling and Krost, attys.

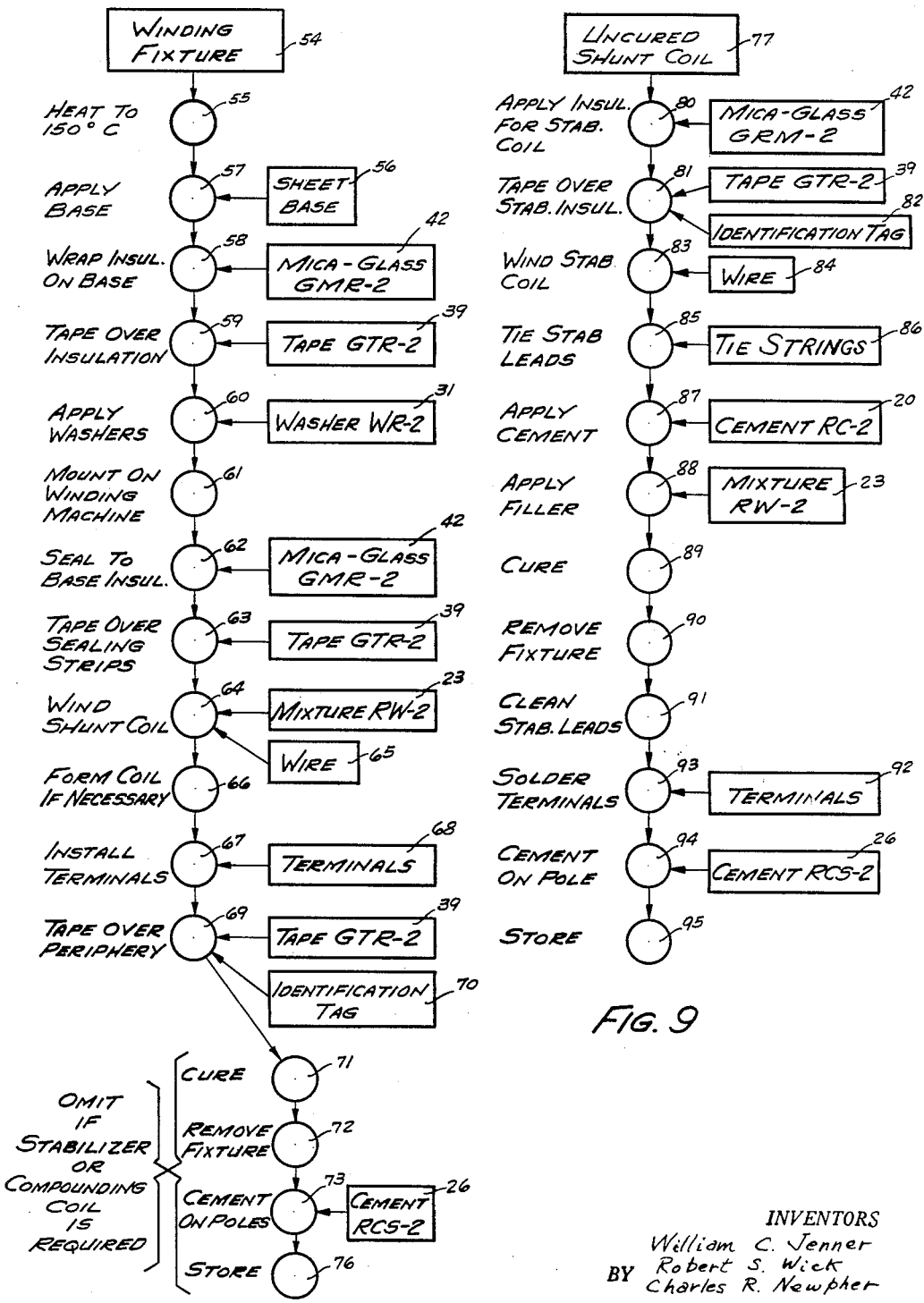

July 26, 1955 W. C. JENNER ET AL 2,713,715
COIL MAKING METHOD
Filed May 27, 1952 4 Sheets-Sheet 4

INVENTORS
William C. Jenner
Robert S. Wick
BY Charles R. Newpher
Woodling and Krost,
attys.

United States Patent Office 2,713,715
Patented July 26, 1955

2,713,715

COIL MAKING METHOD

William C. Jenner, Robert S. Wick, and Charles R. Newpher, Cleveland, Ohio, assignors to The Reliance Electric and Engineering Company, a corporation of Ohio Application May 27, 1952, Serial No. 290,244

6 Claims. (Cl. 29—155.57)

The invention relates in general to a method of making a coil, and more particularly to a method of making a coil structure using a thermosetting resin which with the wound layers of the coil wire can be cured or set into an integrated mass having no dead air spaces.

The invention is particularly applicable to a method of making a field coil for the frame of a dynamoelectric machine wherein the coil is a solid integrated mass which does have a good thermal conductivity to the frame of the machine. Because of this good thermal conductivity, the heat produced in the coil by the passage of electrical current may be rapidly dissipated and as a result, the wattage input to the coil may be increased for the same temperature rise, which means that the physical size of the coil can be reduced, yet it will have the same magnetomotive force. This means that the physical size of the entire dynamoelectric machine may be reduced for a saving both of iron in the frame and copper in the coil.

The method of this invention produces a solid, integrated coil and core structure. One starts with a form which can be heated. On this form is wrapped at least one layer of a fabric which has been impregnated with a thermosetting resin and pre-cured, or partially cured, so that the fabric is flexible yet tacky. The heat of the form softens the resin impregnated in the fabric as it is wrapped on this form, hence helps to make the fabric stick together and to the form. This makes the axial portion of an insulating bobbin, which also preferably has lateral end portions to contain the wire coil which is next wound on this bobbin. As the wire is being wound, more thermosetting resin is added to fill the voids or interstices between the wires and between the layers of wire. Next another layer of resin impregnated and precured fabric is wound on the coil for external protection. The entire unit is then heated to cure the thermosetting resins, which makes an integrated coil structure with an absence of dead air spaces therein while maintaining a high value of electrical insulation between the coil and the core. This completed coil structure, in actual manufacture, has been found to ring like a bell when struck with a hard object.

Consequently an object of the invention is to provide a method for making a complete coil structure which has good heat conductivity to a metallic core of the coil, while satisfying all electrical requirements.

Another object of the invention is to provide a method for making a coil structure which is a solid integrated mass without any dead air spaces therein.

Still another object of the invention is to make a field coil for a dynamoelectric machine which can be smaller for the same magnetomotive force and the same temperature rise.

Yet another object of the invention is to provide a coil structure for a salient magnetic pole wherein the coil has a good heat conductivity to the metal core and ventilating air, achieved by a thermosetting resin filling the voids between the wires and the external insulation.

Other objects and a better understanding of the invention may be had by referring to the following description and claims taken in conjunction with the accompanying drawing, in which:

Figure 8 is a flow chart showing a method of using the items produced in the sub-processes to make a complete coil structure;

Figure 9 is another flow chart showing a process which can be added on to the process shown in Figure 8;

Figure 1:
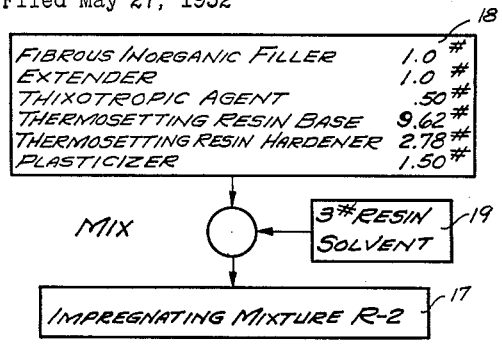
Figure 1 is a flow chart of a method of performing a sub-process; namely, the making of an impregnating mixture.

The Figure 8 shows a complete process for making a coil structure and the Figures 1 to 7 show sub-processes which produce items used in the complete process of Figure 8. Briefly the Figure 8 shows that the complete process includes the winding of a cloth preferably glass fiber cloth upon a form and this glass fiber cloth has previously been impregnated with a thermosetting resin which may be partially cured. The Figure 1 shows a sub-process for making an impregnating mixture for use in impregnating the fabric used in the complete process. This impregnating mixture 17 includes a mixture of six elements in the box 18. These six elements, as set forth in this example, include a fibrous inorganic filler, an extender, a thixotropic agent, a thermosetting resin base, a hardener for the base, and a plasticizer. These six items are mixed together and then a resin solvent 19 is added and mixed to produce the impregnating mixture 17 which is a liquid. The fibrous inorganic filler which has been used and found satisfactory is essentially extremely small asbestos fibers which look like talcum powder. This has a "bridging" characteristic which adds strength to the resin. The extender which has been used is a powder to extend the resin so that the resin content of the entire mass can be kept to a minimum. The fibrous filler also has the same effect. The powder extender which has been selected is one which is a metallic oxide; namely, sintered aluminum oxide. This has the desired characteristic of being a good electrical insulation and yet to some degree the almost inconsistent property of having good thermal conductivity. Further this metallic oxide acts as a catalyst to speed up the curing process. Both fillers reduce shrinkage and thermal coefficient of expansion.

The thixotropic agent which has been used is a very light form of silica and it gives to the fluid into which it is mixed a characteristic whereby the viscosity is low when the fluid is in motion but is high when not forced to move. This is helpful during the impregnation of the cloth or fabric so that the impregnating mixture 17 will readily soak into the cloth and produce a more uniform coating across the web or fabric. The resin base may be a self-setting resin, but is preferably a thermosetting type plastic resin which also is preferably a low pressure resin which may be cured at elevated temperatures; for example, 130 to 220 degrees centigrade at as low as contact pressure. One resin of this type is the high temperature, high strength thermosetting epoxy resin. It holds satisfactory electrical and mechanical characteristics at elevated temperateures of 150 to 200 degree centigrade. This epoxy resin has no by-products from the reaction of curing. This resin base is usually in the form of a dry powder which has been dissolved in suitable solvents for ease of handling. The resin hardener, which is also in liquid form is necessary to the curing reaction or polymerization. The two when mixed together will gradually cure at room temperatures and hence this mixture, as well as the impregnating mixture 17, would ordinarily be refrigerated to prevent the curing if the mixture is to be stored. The plasticizer is used for the purpose of giving to the impregnated mica-glass cloth the desired tackiness and flexibility. The plasticizer has a long chain molecular structure which intermingles with the three dimensional tight linking system of the basic resin and provides some flexibility and toughness. The aforementioned six elements are mixed together and then are mixed with the resin solvent 19 to form the liquid impregnating mixture 17.

Figure 2:
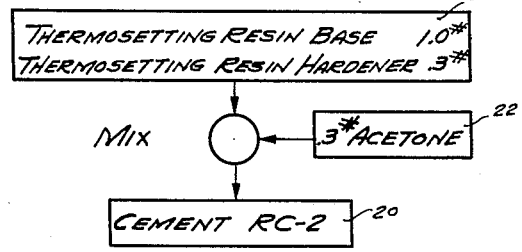
Figures 2 to 7 are flow charts showing methods of performing other sub-processes.

The Figure 2 shows a sub-process of making a cement 20. This cement 20 is made by mixing together, as shown at the box 21, a thermosetting resin base and hardener and then adding to it acetone 22 to make the liquid cement 20.

Figure 3:
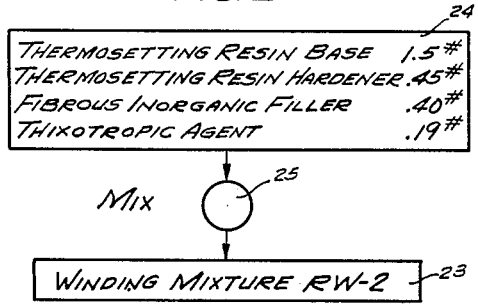

The Figure 3 shows another sub-process of making a winding mixture 23. This is made of four elements as shown in the box 24; namely, the thermosetting resin base, the hardener therefor, the fibrous inorganic filler, and the thixotropic agent. These are mixed together at the station 25 and result in the winding mixture 23.

Figure 4:
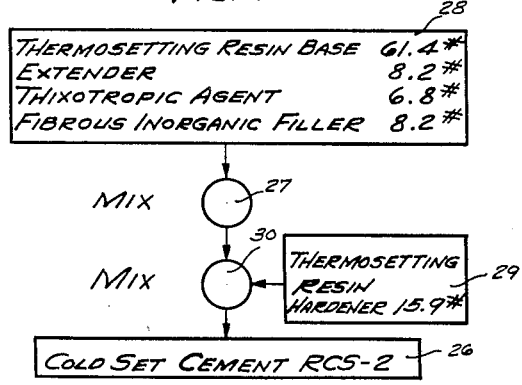

The Figure 4 shows a sub-process for making a self-setting or cold-set cement 26. This includes mixing, at the station 27, the four elements shown in the box 28; namely, the thermosetting resin base, the extender, the thixotropic agent, and the fibrous inorganic filler. After these are mixed, the thermosetting resin hardener shown in box 29 is added and mixed in at station 30 to make the cold set cement 26. This cement should be mixed just prior to use since it will cure rapidly at room temperatures.

Figure 5:
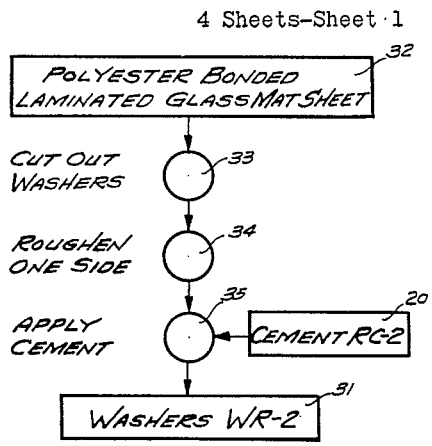

The Figure 5 shows a sub-process for making washers 31 which form part of the insulating bobbin. The box 32 shows that the raw material is a polyester bonded laminated glass mat sheet, although other insulating sheet materials may be used. At the station 33, these washers are cut to shape from this large sheet 32. At the station 34 one side of the washers is roughened and at the station 35 the cement 20 is applied to the roughened side of the cut-out washer to form the completed washer 31.

Figure 6:
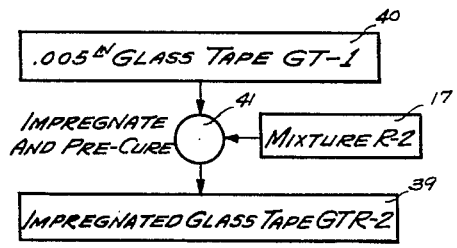

The Figure 6 shows the sub-process for making impregnated glass tape 39. The box 40 shows that the raw material is glass tape .005 inch thick. At the station 41, the impregnating mixture 17 is added by impregnation to the glass tape. The precuring done at station 41 is a heating of the impregnated tape which drives off the solvent 19 and precures the resin to a stage in which when heated to the subsequent curing temperature, the resin flows very slowly. In practice this precuring is such as to effect about six or seven percent cure of the resin. Glass cloth may be similarly impregnated, then slit into desired tape widths.

Figure 7:
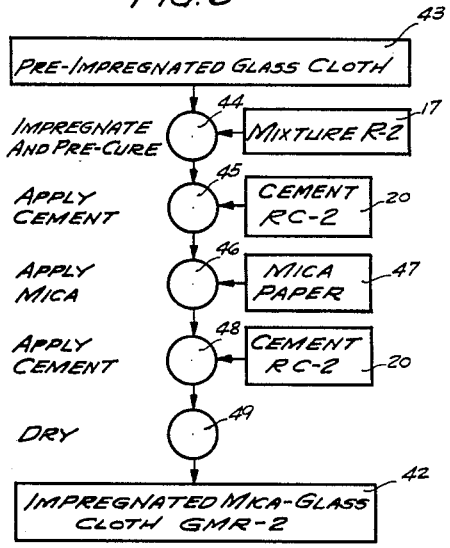

The Figure 7 shows a sub-process of making impregnated mica-glass cloth 42. The raw material here is shown in the box 43 as being pre-impregnated glass cloth. The pre-impregnated glass cloth 43 is a cloth made from glass fibers similar to the glass tape 40. However, this glass cloth generally comes in rolls 38 inches wide. Since the coil to be wound may have a short axial length of, for example, four inches, this glass cloth must be cut into strips about four inches wide. If the raw glass cloth were to be cut into strips, there would be many loose ends of the fibers, which would be undesirable. The pre-impregnation is carried out on the entire 38 inch width cloth and the pre-impregnating mixture is essentially the cement 20 except that it is much thinner by virtue of having a greater quantity of acetone. This very thin cement or mixture is used to impregnate the 38 inch width of cloth which prevents unravelling of the loose ends after the cloth is cut into narrow strips. Additionally, the pre-impregnation is helpful because the low viscosity of the pre-impregnating mixture assures that each fiber becomes coated and there are no air pockets in the cloth.

The pre-impregnated glass cloth, at the station 44, is impregnated with the impregnating mixture 17 and then pre-cured. The impregnation of the pre-impregnated glass cloth may be accomplished by immersing the cloth in a vat containing the impregnating mixture 17, and then drawing it upwardly out of the mixture and between a pair of parallel doctor rolls. The spacing between the doctor rolls is set at about .015 inch greater than the thickness of the glass cloth. This effects a uniform thickness of the impregnated glass cloth, and assures a uniform ratio of cloth to resin impregnate. The precuring at this station 44 is a heating to effect partial cure of the impregnate. Next, at station 45, the cement 20 is added to one side of this glass cloth. At station 46, a mica-paper 47 is added to the cement covered side of the glass cloth. This mica-paper is a very thin paper made from small flakes of mica. At station 48, another layer of cement 20 is added to the mica paper. At station 49, the sandwiched layers are dried to result in the impregnated mica glass cloth 42. Obviously the process described in Figure 7 can be refined into a continuous process.

The drying step, at station 49, may be carried out in a tower or oven in which heat is applied to drive off the solvent and to precure the resin to a point where they are no longer tacky when cool. These epoxy resins used as the thermosetting resin have the unique property that the curing or polymerization may be stopped by cooling after a certain percentage of the bonds are formed, and hence no more links will join. As more links join, the viscosity of the resin becomes higher until a hard mass or complete polymerization results. The impregnated mica-glass cloth 42 is thus only partially cured and as a result has sufficient flexibility so that the cloth can be easily handled and further it has a tackiness when hot so that it will stick to things with which it comes in contact.

Figure 10:
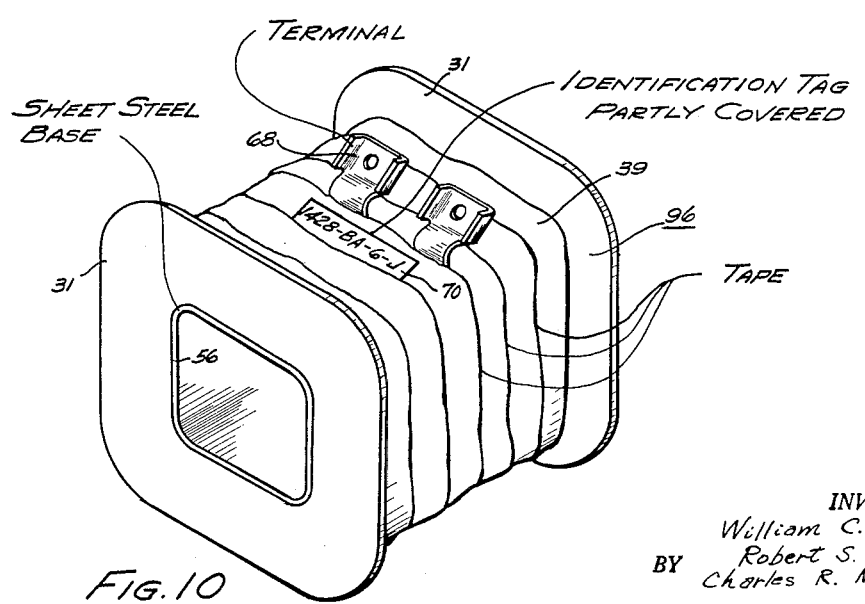
Figure 10 is an isometric view of a cured field coil made by the process of Figure 8.

The Figure 8 shows the complete process for making a coil structure. A winding fixture 54 is selected and this may be a rectangular solid of metal or other suitable material. Preferably the four parallel edges of this rectangular solid are rounded to result in a coil having an internal shape as shown in Figure 10. This winding fixture is next, at the station 55, heated to a suitable temperature, for example, 150 degrees centigrade. A sheet steel base 56 is next applied to this winding fixture at the station 57. Any sheet material which forms a release from the winding block may be used in place of steel. This sheet base is a hollow sleeve which covers the four sides of the winding fixture which lie between the four rounded edges. Next, at the station 58, the mica-glass cloth 42 is applied as a narrow strip of cloth which may be wrapped around the sheet base, and because of the heat of the winding fixture transmitted through the sheet base 56, the mica-glass cloth will become very sticky and will cling to the sheet base. At station 59, the glass tape 39 is added over the mica-glass cloth 42. At station 60, two washers 31 are added, one on each end of the winding fixture 54. The sides of the washers which have been coated with cement are positioned toward the inside. At station 61 the winding fixture 54 is then mounted on a coil winding machine. At the joint between the washers and the glass tape 31, a narrow strip of mica-glass cloth 42 is added at station 62 as a joint seal. At station 63, the glass tape 39 is added over the sealing strips. The glass tape and cloth and the washers at this point form a bobbin of which at least the surface is an electrical insulation and is formed of a thermosetting resin.

Figure 11:
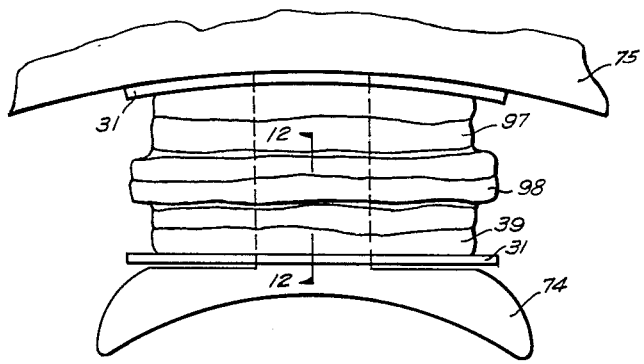
Figure 11 is a plan view of a completed field coil having an additional stabilizing coil thereon and mounted on the frame of a dynamoelectric machine.

At station 64, insulated wire 65 is wound upon the bobbin and at about the same time, the winding mixture 23 is added. A convenient way to do this is by the use of a small brush which coats the wire with the liquid winding mixture 23 as the wire is wound upon the bobbin. Alternatively, a layer of wire could be wound upon the bobbin and then this wire coated with the winding mixture before starting to wind the next layer of wire. The resin in the glass tape 39 and mica glass cloth 42 becomes soft by the heat from the form, thus flowing under the pressure of winding, and compensating for the variations between the coil and the core. The insulation on this wire 65 is preferably a class B insulation which means some form of inorganic insulation. Class A insulation may be used; namely, organic insulation, however, the remainder of the coil structure may include inorganic materials. This makes the entire coil structure 96 conform to class "A" specifications. If class "B" requirements are to be met, the insulation on the wire 65 would likewise have to be class "B" insulation. At station 66, the shape of the coil is formed or changed, if necessary, and this is shown in Figure 11 wherein one of the washers has been bent into a curved plane so that it will conform to the shape of the frame or the support for the coil. This saves space in the dynamoelectric machine. At station 67, the terminals 68 are applied to the ends of the wire in the coil. At station 69, more glass tape 39 is applied to cover the outer periphery of the wound coil. Also at this station 69, an identification tag 70 may be added so that one will be able later to identify the coil.

At this point in the flow chart of Figure 8, the process may take either one of two alternatives. It may proceed to the additional process shown in Figure 9, or it may continue through the four additional steps shown in Figure 8. This latter method will first be explained. At station 71, the wound and insulated coil is cured by heating or baking to a desired temperature; for example, 150 degrees to 200 degrees centigrade for a length of time sufficient to cure the entire coil structure as a solid mass. This forms a solid mass without any dead air spaces therein so that heat from the wires in the coil may readily be conducted to the exterior surface of the coil. At station 72, the coil structure is removed from the winding fixture 54. The completed coil structure may next be placed in inventory at this point and it will appear as shown in Figure 10. However, the coil structure may be treated as at station 73 wherein it is cemented on a laminated sheet metal pole 74 by use of the cold-set cement 26. The composite coil and pole will then appear as shown in Figure 11, except that the pole 74 will not be fastened onto a frame 75 as shown in this figure. The composite coil and pole structure may then be placed in inventory or storage as shown at station 76.

Figure 12:
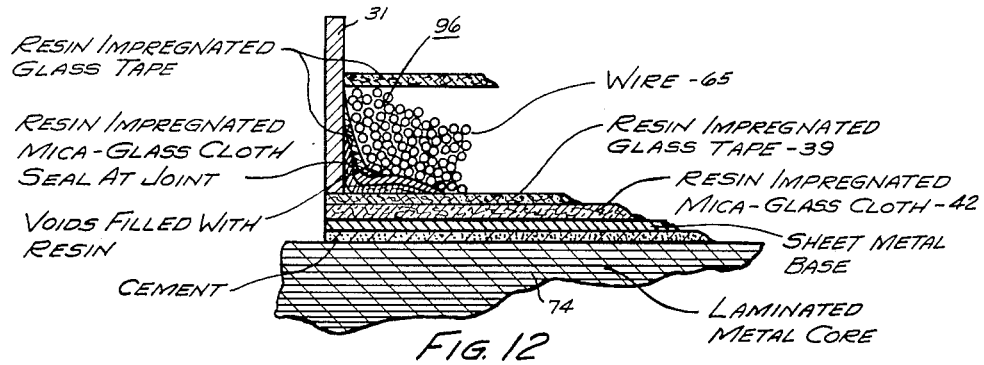
Figure 12 is an enlarged sectional view on the line 12—12 of Figure 11.

Figure 9 shows an alternative to the last four steps outlined in Figure 8, wherein the uncured shunt coil, as shown in box 77, is that which has been taken from the station 69. This Figure 9 shows the additional process for adding a stabilizing or a compounding coil should this be required for the field of the dynamoelectric machine. At station 80, mica-glass cloth 42 is added over the center portion of the taped outer periphery of the coil. Next a layer of the glass tape 39 is added at the station 81 and another identification tag 82 may be added to identify that particular stabilizing coil. At station 83, a stabilizing coil 98 is wound and this is generally of a relatively heavy wire 84, since in the field of a motor or generator, this winding would normally be in series, whereas the wire of the uncured shunt coil 77 would normally be in parallel, with the terminals of this motor or generator. At station 85, tie strings 86 are added to the ends of the wire in the stabilizer coil and these ends are tied together so that the coil will not become loosened. At the station 87, the cement 20 is added to the exterior surface of the stabilizing coil and then at station 88, the winding mixture 23 is added. This winding mixture 23 has, as shown in Figure 2, a fibrous inorganic filler therein to fill up the voids in and between the laps of glass tape. At station 89, the uncured shunt and stabilizer coils are cured by heating as at station 71 in Figure 8. The cured coil is removed from the winding fixture at station 90 and the ends of the leads to the stabilizer coil are cleaned at station 91. Terminals 92 are then soldered or brazed to the leads of the stabilizer coil at station 93. The completed coil structure may then be cemented on the pole piece by the cold-set cement 26 at station 94 and placed in storage as shown at station 95. The Figure 10 shows the completed and cured shunt coil 96 as formed by the process of Figure 8; namely, without the stabilizing coil. The Figure 11 shows the completed coil structure 97 having the stabilizing coil 98 thereon and cemented on the pole 74. This coil and pole assembly is also shown as being fastened to the frame 75 of a dynamoelectric machine. The Figure 12 shows an enlarged sectional view of the coil 96 as cemented on the pole 74. This Figure 12 particularly shows the sealing strips of mica-glass cloth and tape at the joint between the washers 31 and the glass tape 39 along the axial portion of the coil.

Figure 13:
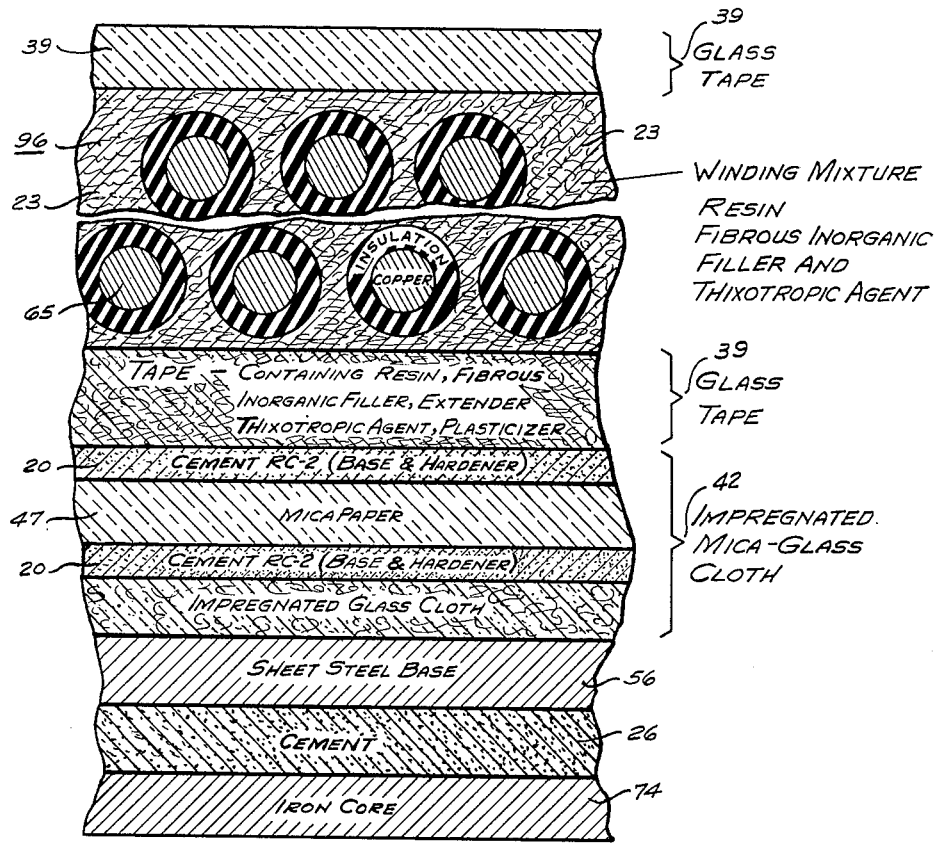
Figure 13 is a greatly enlarged sectional view similar to Figure 12.

Figure 13 shows to a considerably enlarged scale a sectional view through the completed coil 96 as it is cemented upon the pole. Starting at the bottom of Figure 13, there is shown a portion of the core or pole piece 74. Next is a layer of the cold-set cement 26. Next is the sheet steel base 56. Next is a layer of the impregnated mica-glass cloth 42 which consists of four separate layers; namely, the impregnated glass cloth, the cement 20, the mica paper 47, and another layer of the cement 20. Next there is a layer of the glass tape 39. The layer of mica-glass cloth 42 and glass tape 40 forms the axial portion or winding surface portion of the bobbin. Next is a plurality of layers of wire 65 which is insulated wire. The last layer on the completed coil 96 is another layer of the glass tape 39. Between the layers of wire and between the individual wires, in each layer, the winding mixture 23 is found and this completely fills all voids and interstices. Thus when the coil is cured, the entire coil structure is a solid integrated mass which readily conducts heat inwardly through the sheet steel base 56 to the iron core 74.

Figure 13 shows the individual wires separated in order to better show the winding mixture 23 between the wires. In reality, the insulation of adjacent wires may be, and preferably are, in contact, in order to conserve space and to improve heat transfer.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of making a salient field coil for a field winding of a direct current dynamoelectric machine having a frame comprising, selecting a metallic form, heating said form to about 150 degrees centigrade, wrapping a sheet steel base around said form, wrapping impregnated mica glass cloth around said sheet steel base, wrapping a layer of impregnated glass tape on said cloth, applying first and second washers of insulating material on each end of the form extending laterally from the form, said washers having applied to the inside surface thereof a resin cement, wrapping a layer of impregnated mica glass cloth as a seal at the joint of each of the washers and the glass tape, wrapping impregnated glass tape over the joint seal, winding a plurality of layers of insulated wire as a coil on the glass tape and substantially simultaneously adding a thermosetting resin to said wire, bending one of said washers in a shape other than a single plane to conform to the shape of said frame, installing terminals on the ends of the wires in said coil, wrapping impregnated glass tape over the completed coil, said impregnated glass tape and impregnated mica glass cloth being impregnated with a thermoplastic resin and partially cured to a tacky yet flexible state, all of said thermosetting resins and cements being chemically compatible to be cured into an integrated mass, and curing the aforementioned coil and insulation layers and washers to make a completed coil structure as a solid mass with a substantially complete lack of dead air spaces therein.

2. The method of making a composite salient field coil structure for a field winding of a direct current dynamoelectric machine having a frame comprising, selecting a form, heating said form, wrapping a sheet steel base around said form, wrapping a layer of impregnated glass cloth around said sheet steel base, applying first and second washers of insulating material on each end of the form extending laterally from the form, said washers having applied to the inside surface thereof a cement, wrapping a layer of impregnated glass cloth at the joint of each of the washers and the first layer of glass cloth, winding a plurality of layers of insulated wire as a coil on the glass tape, adding a thermosetting resin to said wire layers, bending one of said washers in a shape other than a single plane to conform to the shape of said frame, installing terminals on the ends of the wires in said coil, wrapping impregnated glass cloth on said coil, winding a layer of wire as a second coil on said last mentioned glass cloth, applying a layer of thermosetting resin cement and a filler to said second coil, said impregnated glass cloth being impregnated with a thermoplastic resin having a partial cure to a tacky yet flexible state, all of said thermosetting resins and cements being chemically compatible to be cured into an integrated mass, and curing the aforementioned coils and insulation layers and washers to make a composite coil structure as a solid mass with a substantially complete lack of dead air spaces therein.

3. The method of making a composite salient field coil structure for a field winding of a direct current dynamoelectric machine having a frame, comprising, selecting a form, wrapping a sheet steel base around said form, wrapping impregnated mica glass cloth around said sheet steel base, wrapping a layer of impregnated glass tape on said cloth, applying first and second washers of insulating material on each end of the form extending laterally from the form, said washers having applied to the inside surface thereof a cement, wrapping a layer of impregnated mica glass cloth as a seal at the joint of each of the washers and the glass tape, wrapping impregnated glass tape over the joint seal, winding a plurality of layers of wire as a coil on the impregnated glass tape and substantially simultaneously adding a thermosetting resin to said wire layers, bending one of said washers in a shape other than a single plane to conform to the shape of said frame, installing terminals on the ends of the wires in said coil, wrapping impregnated glass cloth over the completed coil, wrapping additional impregnated glass tape on said cloth, winding a layer of relatively heavy conductor wire as a second coil on said last mentioned glass tape, applying a layer of thermosetting resin cement to said second coil, applying a filler containing a thermosetting resin to said second coil, curing the aforementioned coils and insulation layers and washers to make a composite coil structure as a solid mass with a substantially complete lack of dead air spaces therein, said layers of glass tape and mica glass cloth being impregnated with a thermoplastic resin, all of said thermosetting resins and cements being compatible to be cured into an integrated mass.

4. The method of making a composite salient field coil structure for a field winding of a direct current dynamoelectric machine having a frame comprising, selecting a metallic form, heating said form to about 150 degrees centigrade, wrapping a sheet steel base around said form, wrapping impregnated mica glass cloth around said sheet steel base, wrapping a layer of impregnated glass tape on said cloth, applying first and second washers of insulating material on each end of the form extending laterally from the form, said washers having applied to the inside surface thereof a resin cement, wrapping a layer of impregnated mica glass cloth as a seal at the joint of each of the washers and the glass tape, wrapping impregnated glass tape over the joint seal, winding a plurality of layers of insulated wire as a coil on the glass tape and substantially simultaneously adding a thermosetting resin to said wire, bending one of said washers in a shape other than a single plane to conform to the shape of said frame, installing terminals on the ends of the wires in said coil, wrapping impregnated mica glass cloth over the completed coil, wrapping additional impregnated glass tape on said cloth, winding a layer of relatively heavy conductor wire as a second coil on said last mentioned glass tape, applying a layer of thermosetting resin cement to said second coil, applying a fibrous inorganic filler containing a thermosetting resin to said second coil, said impregnated glass tape and impregnated mica glass cloth being impregnated with a thermoplastic resin and partially polymerized to a tacky yet flexible condition, said glass cloth also having mica flakes carried in said resin, all of said thermosetting resins and cements being chemically compatible to be cured into an integrated mass, and curing the aforementioned coils and insulation layers and washers to make a composite coil structure as a solid mass with a substantially complete lack of dead air spaces therein, and removing said composite coil structure from said form.

5. The method of making a composite salient field coil structure for a field winding of a direct current dynamoelectric machine having a frame comprising, selecting a metallic form, forming a bobbin on said form with two lateral end plates and an axial portion therebetween of a thermosetting plastic resin, heating at least said axial portion to a given temperature, winding a plurality of layers of insulated wire as a coil on the glass tape and substantially simultaneously adding a thermosetting resin to said wire layers, bending one of said end plates in a shape other than a single plane to conform to the shape of said frame, installing terminals on the ends of the wires in said coil, wrapping impregnated mica glass cloth on said coil, winding impregnated glass tape on said cloth, winding a layer of wire as a second coil on said glass tape, applying a layer of thermosetting resin cement to said second coil, applying a fibrous inorganic filler containing a thermosetting resin to said second coil, said impregnated glass tape and impregnated mica glass cloth being impregnated with a thermoplastic resin having a partial cure to a tacky yet flexible state at least at said given temperature, all of said thermosetting resins being chemically compatible to be cured into an integrated mass, and curing the aforementioned coils and insulation layers and bobbin to make a composite coil structure as a solid mass with a substantially complete lack of air therein.

6. The method of making a salient field coil for a field winding of a direct current dynamoelectric machine having a frame comprising, selecting a metallic form, heating said form to about 150 degrees centigrade, wrapping a sheet steel base around said form, wrapping impregnated mica glass cloth around said sheet steel base, wrapping a layer of impregnated glass tape on said cloth, applying first and second washers of insulating material on each end of the form extending laterally from the form, said washers having applied to the inside surface thereof a resin cement, wrapping a layer of impregnated mica glass cloth as a seal at the joint of each of the washers and the glass tape, wrapping impregnated glass tape over the joint seal, winding a plurality of layers of insulated wire as a coil on the glass tape and substantially simultaneously adding a thermosetting resin to said wire, installing terminals on the ends of the wires in said coil, wrapping impregnated glass tape over the completed coil, said impregnated glass tape and impregnated mica glass cloth being impregnated with a thermosetting resin and partially cured to a tacky yet flexible state, all of said thermosetting resins and cements being chemically compatible to be cured into an integrated mass, and curing the aforementioned coil and insulation layers and washers to make a completed coil structure as a solid mass with a substantially complete lack of dead air spaces therein.

References Cited in the file of this patent

UNITED STATES PATENTS

| | | |
|---|---|---|
| 1,826,297 | Apple | Oct. 6, 1931 |
| 1,976,895 | Snell | Oct. 16, 1934 |
| 2,091,234 | Branson | Aug. 24, 1937 |
| 2,172,445 | Lutz | Sept. 12, 1939 |
| 2,216,464 | Verrill | Oct. 1, 1940 |
| 2,252,208 | Rosing | Aug. 12, 1941 |
| 2,442,587 | Coggeshall et al. | June 1, 1948 |
| 2,464,568 | Flynn et al. | Mar. 15, 1949 |
| 2,471,869 | Gebel | May 31, 1949 |
| 2,595,791 | Hunt | May 6, 1952 |
| 2,602,037 | Nelb | July 1, 1952 |